United States Patent [19]

Braus et al.

[11] Patent Number: 4,847,135
[45] Date of Patent: Jul. 11, 1989

[54] COMPOSITE MATERIAL FOR SLIDING SURFACE BEARINGS

[75] Inventors: Jurgen Braus, Walldorf; Hans-Paul Baureis, Dielheim; Wolfgang Bickle, Reilingen, all of Fed. Rep. of Germany

[73] Assignee: Kolbenschmidt Aktiengesellschaft, Neckarsulm, Fed. Rep. of Germany

[21] Appl. No.: 181,460

[22] Filed: Apr. 14, 1988

Related U.S. Application Data

[63] Continuation-in-part of Ser. No. 5,009, Jan. 20, 1987, abandoned, which is a continuation-in-part of Ser. No. 5,170, Jan. 20, 1987, abandoned.

[30] Foreign Application Priority Data

Jan. 21, 1986 [DE] Fed. Rep. of Germany ....... 3601569
Jan. 21, 1986 [DE] . Fed. Rep. of Germany ....... 3601568

[51] Int. Cl.$^4$ .............................................. B32B 3/10
[52] U.S. Cl. .................................... 428/138; 428/135; 428/422; 428/461; 428/463; 428/473.5; 252/12; 384/907; 384/908; 384/911
[58] Field of Search ............... 428/135, 138, 422, 461, 428/473.5, 463; 252/12; 384/907, 908, 911

[56] References Cited

U.S. PATENT DOCUMENTS

| | | | |
|---|---|---|---|
| 4,156,049 | 5/1979 | Hodes et al. ........................ | 428/422 |
| 4,624,887 | 11/1986 | Bickle et al. ........................ | 428/422 |
| 4,626,365 | 12/1986 | Mori ..................................... | 252/12 |
| 4,666,787 | 5/1987 | Bickle et al. ......................... | 252/12 |

Primary Examiner—Alexander S. Thomas
Attorney, Agent, or Firm—Sprung Horn Kramer & Woods

[57] ABSTRACT

In a composite material for sliding surface bearings, a rough metallic surface is provided with a polymeric matrix, which forms a friction contact or sliding layer over the rough base surface. To increase the wear resistance, the matrix contains zinc sulfide and/or barium sulfate in a particle size from 0.1 to 1.0 $\mu$m and an average particle size of 0.3 $\mu$m.

25 Claims, 4 Drawing Sheets

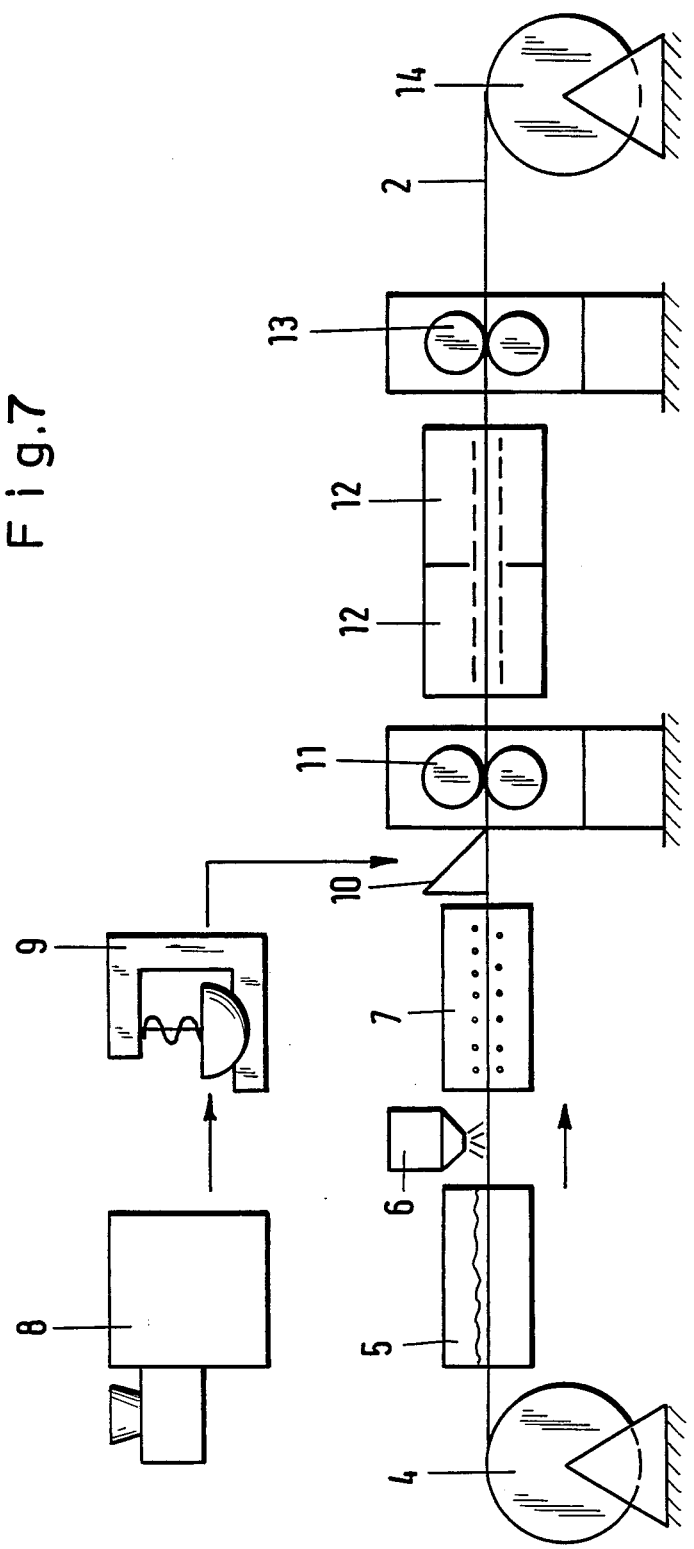

COMPOSITE MATERIAL FOR SLIDING SURFACE BEARINGS

CROSS REFERENCES TO RELATED APPLICATIONS

This application is a continuation-in-part application of application Ser. No. 07/005,009, filed Jan. 20, 1987, now abandoned, and application Ser. No. 07/005,170, filed Jan. 20, 1987, now abandoned.

BACKGROUND OF THE INVENTION

1. Field of the Invention

This invention relates to a composite material for sliding surface bearings, in which a polymeric matrix is bonded to a metallic rough base surface to form a friction contact or sliding layer in a thickness from 0.01 to 2.0 mm over the peaks of the rough base surface.

2. Background Information

The use of polymers in the manufacture of sliding surface bearings in which the sliding surfaces are defined by walls consisting of a single material is restricted because polymers have a relatively low strength, a large thermal expansion and a low thermal conductivity. It has been attempted to avoid such restriction in that a polymeric matrix containing optional additives, such as lead, molybdenum disulfide, graphite, glass fibers or other inorganic fibers, individually or in combination, is rolled or pressed onto a rough base surface consisting of woven metal mesh or expanded metal, and is subsequently sintered (East German Patent Specification No. 30,963, German Patent Specification No. 2,001,101, European Patent Specification No. 40,448).

In accordance with German Patent Specification No. 2,928,081 the fluorine-containing polymer which constitutes the matrix is rolled or pressed directly on a rough base surface which has been formed by a mechanical or chemical roughening of the surface of a metallic backing layer, which preferably consists of steel, or on a rough base surface formed by a sintered or sprayed-on porous layer which has been provided on the metallic backing layer in a thickness from 0.2 to 0.6 mm and consists of a metallic material having good friction or sliding properties, whereafter the polymer is applied to the rough base surface in such a manner that a friction contact or sliding layer in a thickness from 30 to 500 $\mu$m over the peaks of the rough base surface is provided. The rough base surface ensures an excellent bond between the matrix and the backing layer so that the sliding surface bearing elements made from the composite material for sliding surface bearings are very similar with regard to interference fit, elastic properties and thermal expansion to metallic materials for sliding surface bearings and for this reason can also be used in relatively small wall thicknesses.

In comparison with sliding surface bearings in which the sliding surfaces are defined by walls consisting of a single polymeric material, bearing elements made of composite materials for sliding surface bearings afford the advantage that they have a higher thermal conductivity and a higher strength. Besides, the sliding surface bearing elements made of the composite material for sliding surface bearings usually have a very high load-carrying capacity up to about 150 N/mm$^2$, although this is achieved only at extremely low sliding velocities of up to 1 m/sec. A true limit in the case of oil-less operation is believed to be at 2 meters per second and it will be understood that an appreciable load cannot be tolerated at such a sliding velocity. For this reason, such composite materials for sliding surface bearings have been used mainly for sliding surface bearing elements which are subjected to oscillating motions, such as hinge bearings. But sliding surface bearing elements made of composite materials for sliding surface bearings are also widely used as guide bushings in shock absorbers for motor vehicles.

Materials for sliding surface bearings as described in European Patent Specification 40,448 can be cut and punched out as desired and such materials ensure that no portions of the expanded metal will be detached as the material is punched or cut out during its subsequent processing or use. Besides, material for sliding surface bearings has a comparatively high dimensional stability so that it can easily be automatically inserted into bearing bushings and split bearing shells during assembling operations. When the friction contact or sliding layer provided on the lands of the expanded metal has been worn off, the expanded metal itself will have very good emergency running properties.

Maintenance-free material for sliding surface bearings is inserted mainly into bearing bushings and split bearing shells in which a hydrodynamic lubrication is not provided, so that a progressive wear must be expected in spite of the presence of substances which influence the frictional and sliding properties, such as lead and glass fibers. Besides, the use of lead in the friction contact or sliding layer imposes a limit on the field of application of the materials for sliding surface bearings, because such materials cannot be used in certain machines, particularly in machines used in the pharmaceutic and food-processing industries.

SUMMARY OF THE INVENTION

For the above reasons it is an object of the invention to improve the hereinabove described composite material for sliding surface bearings, particularly to improve the wear resistance of the friction contact or sliding layer and thus to increase the life or service life of the sliding surface bearings made of such material, whereas the desirable friction properties, the high resistance to elevated temperature and the desirable coefficient of expansion of the friction contact or sliding layer and the high bond strength between the friction and contact layer and the rough base surface are preserved.

It is furthermore an object of the present invention to provide a sheet material for sliding surface bearings mainly for use in bearing bushings and split bearing shells.

Still further, it is an object of the present invention to increase the field of application of materials for sliding surface bearings.

The above objects and other objects, aims and advantages are accomplished in accordance with the invention in that the matrix contains 5 to 50% by volume, preferably 10 to 40% by volume, zinc sulfide and/or barium sulfate having a particle size from 0.1 to 1.0 $\mu$m and an average particle size of 0.3 $\mu$m. Owing to the presence of the very finely divided zinc sulfide and/or barium sulfate, the wear resistance of the friction contact or sliding layer of the composite material for sliding surface bearings is so distinctly improved that its service life is increased by as much as 30 to 35%, whereas the other mechanical and technological properties of the friction and contact layer are not adversely affected thereby. Besides, the field of application of the sliding surface bearing elements made from the composite material for sliding surface bearings is increased because the absence of lead permits the sliding surface bearing elements to be used, e.g., also in machines for the pharmaceutical and food-processing industries.

BRIEF DESCRIPTION OF THE DRAWINGS

The invention is illustrated more in detail and by way of example in the drawings wherein:

FIG. 7 is a schematic drawing of an apparatus for carrying out the process of manufacturing a sheet material of the invention.

DETAILED DESCRIPTION OF THE INVENTION

Figure 1:
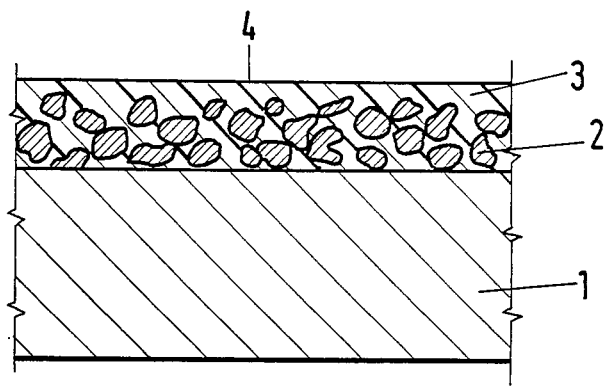
FIG. 1 is a sectional view of the composite material according to the invention.

German Patent Application P No. 34 24 242.0 and corresponding U.S. application Ser. No. 910,036, filed Sept. No. 22, 1986 discloses a composite material for use in the manufacture of low-maintenance sliding surface bearings. In that material, a metallic backing layer consisting of steel, bronze or a high-strength aluminum layer is provided with a rough primer, which has a thickness from 0.1 to 0.35 mm, and on the primer is a friction contact or sliding layer consisting of a matrix of polytetrafluoroethylene (PTFE) and one or more optional additives which improve the friction and sliding properties and may consist of lead, molybdenum sulfide, graphite, carbon fibers, glass fibers, ceramic fibers, glass spheres, barium sulfate, zinc sulfide, lead borosilicate, individually or in combination, in an amount of 5 to 40%. Because in that case, zinc sulfide and barium sulfate have been regarded to be equivalent to a number of other additives as regards the improvement of the friction and sliding properties, German Patent Application No. 34 24 242.0 does not contain a prior description of the teaching of the invention to select zinc sulfide and/or barium sulfate having a specified small particle size.

The term "polymer" used herein includes particularly the known polymers polytetrafluoroethylene, polyvinylidene- fluoride, polyethersulfone, polyetheretherketone, polyetherimide, polyphenylenesulfide, polyacetal, polyamide and polyimide. Individually or in a combination of at least two of said polymers used in a volume ratio of 5 to 35% by volume, the polymers constitute the matrix forming the friction contact or sliding layer of the composite material for sliding surface bearings in accordance with the invention.

The term "zinc sulfide" used herein covers also zinc sulfide particles which contain also 1 to 5% by volume barium sulfate and optionally contain also 0.05% to 0.5% by volume zinc oxide.

In accordance with a further feature of the invention, the matrix may contain strength-increasing additives consisting of glass fibers, glass beads, carbon fibers, ceramic fibers and Aramid (aromatic polyamide) fibers, individually or in combination, in any amount from 5 to 40% by volume, preferably 10 to 25% by volume. In that case, zinc sulfide and/or barium sulfate will act as a dry lubricant.

The carbon fibers, glass fibers, ceramic fibers and Aramid (aromatic polyamide) fibers have a length of $\leq 500$ $\mu$m, preferably from 50 to 300 $\mu$m, and a diameter of $\leq 100$ $\mu$m, preferably from 5 to 50 $\mu$m. The glass spheres have a diameter from 1 to 50 $\mu$m.

In a preferred embodiment, the matrix may contain 1.5 to 15% by volume Aramid (aromatic polyamide) fibers which have a diameter of 0.02 mm to 0.1 mm and a length of 0.3 mm. In accordance with a further feature of the invention the glass fibers are preferably contained in the matrix in an amount from 15 to 35% by volume, have a length from 0.1 to 0.5 mm and a diameter from 0.02 to 0.1 mm.

In a particularly desirable embodiment of the composite material for sliding surface bearings in accordance with the invention, the matrix which constitutes the friction contact or sliding layer consists of a mixture of 44% by volume PTFE having a particle size from $>3$ to $>10$ $\mu$m, 15% by volume glass fibers having a diameter of $\leq 20$ $\mu$m and a length of $\leq 150$ $\mu$m, 25% by volume zinc sulfide having a particle size of $\leq 1$ $\mu$m and 5% by volume Aramid (aromatic polyamide) fibers having a diameter of $\leq 10$ $\mu$m and a length of $\leq 300$ $\mu$m.

In another desirable embodiment of the composite material for sliding surface bearings the matrix which constitutes the friction contact or sliding layer consists of 55% by volume polyvinylidenefluoride having a particle size from $>60$ to $<315$ $\mu$m, 25% by volume zinc sulfide having a particle size of $\leq 1$ $\mu$m, and 20% by volume glass spheres having a particle size from 1 to 50 $\mu$m.

In a third desirable embodiment of the composite material for sliding surface bearings the matrix which constitutes the friction contact or sliding layer consists of 60% by volume polytetrafluoroethylene having a particle size from $>3$ to $<10$ $\mu$m, 20% by volume glass fibers having a diameter of $\leq 20$ $\mu$m and a length of $<150$ $\mu$m, and 20% by volume zinc sulfide having a particle size of $\leq 1$ $\mu$m and containing 0.5% by volume barium sulfate.

In a fourth desirable embodiment of the composite material for sliding surface bearings the matrix which constitutes the friction contact or sliding layer consists of 75% by volume polytetrafluoroethylene having a particle size from $>3$ to $<10$ $\mu$m and of 25% by volume barium sulfate having a particle size of $\leq 1$ $\mu$m.

In a particularly desirable embodiment of the sheet material for sliding surface bearings in accordance with the invention, the matrix consists of a mixture of 56% by volume PTFE having a particle size from $>3$ $\mu$m to $<10$ $\mu$m, 16% by volume glass fibers having a diameter of 20 $\mu$m, and a length of $\leq 150$ $\mu$m, 9% by volume Aramid (aromatic polyamide) fibers having a diameter of $\leq 12$ $\mu$m and a length of $\leq 300$ $\mu$m, and 19% by volume zinc sulfide having a particle size of $\leq 1.0$ $\mu$m.

The matrix may be directly disposed on the mechanically or chemically roughened surface of a metallic backing layer, which particularly consists of steel, bronze or a high-strength aluminum alloy. In a preferred embodiment, the matrix which constitutes the friction contact or sliding layer is applied to a porous rough primer, which consists of bronze and has been sintered or sprayed on a metallic backing. The rough base surface may alternatively be constituted by expanded metal.

Owing to its very small particle size, the zinc sulfide and/or barium sulfate can be very highly dispersed in the polymer so that the wear of the friction contact or sliding layer will be distinctly reduced and formation of cracks in the matrix by mechanical fatigue will be avoided, even during processing at very high temperatures. The desirable properties of the polymer, e.g., PTFE, are thus fully preserved. Because zinc sulfide and barium sulfate inhibit corrosion, the member which is in sliding contact with the bearing will not be subjected to corrosion.

In the production of the composite material for sliding surface bearings in accordance with an embodiment of the invention, a dispersion of the polymer in a latent solvent is mixed with the zinc sulfide and/or barium sulfate and optionally additives for influencing the friction and sliding properties. The mixture is applied to the rough base surface in a layer which has a thickness of 0.01 to 2 mm over the peaks of the surface and is rolled onto the rough base surface at room temperature and is subsequently sintered in that it is continuously heated to about 400° C. and held at that temperature for a short time. Thereafter the friction contact or sliding layer is sized.

The composite material for sliding surface bearings can alternatively be produced in that a mixture of polymer, zinc sulfide and/or barium sulfate and optionally additives for influencing the friction and sliding properties is extruded, the resulting shape is calendered to form a strip having a thickness of 0.5 to 2.5 mm and the strip is then rolled onto the rough base surface, which has previously been heated to such a temperature that the strip can assume a temperature of up to 75° C. The semifinished product is subsequently heated continuously to 400° C. and is held at that temperature for a short time to sinter or fuse the polymer, and is subsequently sized.

Alternatively, the composite material for sliding surface bearings can be produced in that the pulverulent polymer and the pulverulent zinc sulfide and/or barium sulfate and optionally additives for influencing the friction and sliding properties are mixed and the pulverulent mixture is strewn onto the rough base surface and is then continuously heated to a temperature of 280° to 380° C. The polymer is compacted and rolled into the rough base surface in a succeeding rolling operation and is finally sized.

The composite material for sliding surface bearings shown in FIG. 1 consists of a backing layer 1 of steel, a porous tin-lead-bronze primer 2, which has been sintered onto the backing layer and has an open pore volume of 35%, and a matrix 3, which has been rolled onto the primer 2 and consists of polytetrafluoroethylene containing 20% by volume zinc sulfide particles and 20% by volume glass fibers. The friction contact and sliding layer 4 has over the peaks of the primer 2 a thickness of 0.35 mm.

Figure 2:
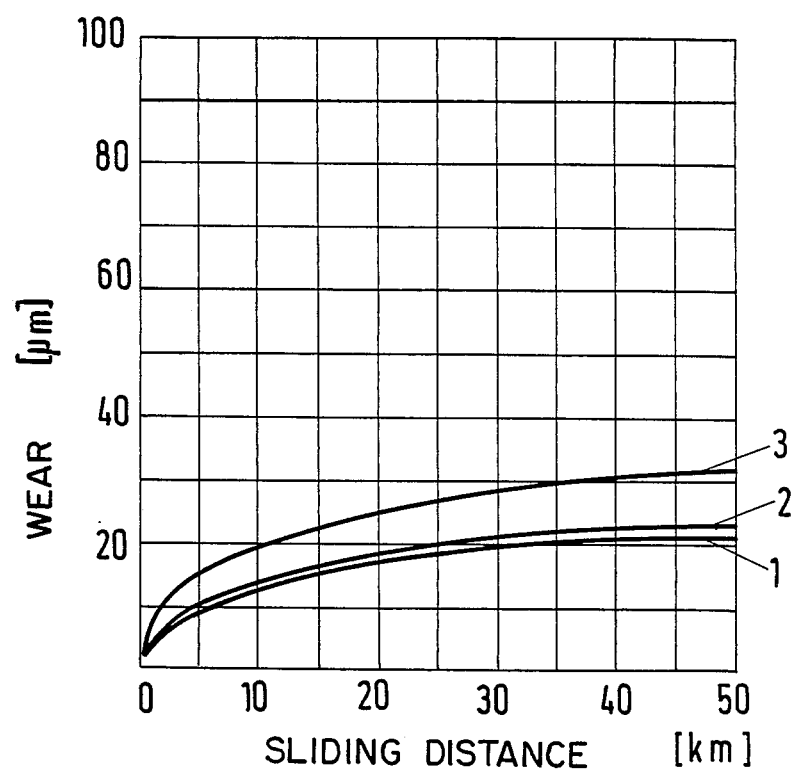
FIG. 2 is a graph showing the wear of the composite material with respect to sliding distance.

FIG. 2 is a graph in which the wear of the composite material for sliding surface bearings is plotted against the sliding distance in curve 1 and the wear of a similar composite material for sliding surface bearings, in which the zinc sulfide had been replaced by barium sulfate, is plotted in curve 2.

Curve 3 represents the wear properties of a composite material for sliding surface bearings of the prior art, in which the friction contact or sliding layer is formed by a matrix consisting of polytetrafluoroethylene which contains 20% by volume lead and 20% by volume glass fibers.

A further aspect of the present invention relates to a sheet material for sliding surface bearings comprising expanded metal having a thickness from 0.3 to 0.9 mm and consisting of a wrought aluminum alloy having an elongation at break $\delta_5 = 8$ to 20% and a Brinell hardness BHN of 35 to 65, and a matrix coating which contains 5 to 25% by volume polytetrafluoroethylene (PTFE) and is disposed on the expanded metal in such a manner that the diamond-shaped openings of the expanded metal are filled with the matrix and a friction contact or sliding layer consisting of the matrix in a thickness of 0.01 to 0.3 mm is provided over the peaks of the expanded metal.

In accordance with a preferred feature of the material for sliding surface bearings in accordance with the invention, alloys of the types AlMgSil or AlMg3 are used as wrought aluminum alloys. Such alloys have exceptionally good emergency running properties.

The high dimensional stability and the high bond strength between the matrix and the expanded metal lath are due to the fact that the expanded metal lath has a mesh opening size of 0.5 mm × 1.0 mm to 2.0 mm × 3.0 mm, preferably of 1.0 mm × 2.0 mm, and a land width from 0.3 to 1.0 mm, preferably of 0.5 mm.

To improve the bond between the matrix and the expanded metal lath, the latter is coated with a primer in a thickness from 2 to 10 μm. The liquid primer consists of 100 parts by weight of a PTFE dispersion, 20 parts by weight chromium phosphate and 45 parts by weight distilled water.

To manufacture the material for sliding surface bearings, a liquid primer is applied to the degreased expanded metal lath and is subsequently dried, the matrix for forming the friction contact or sliding layer is then subsequently sized.

The expanded metal consists of a wrought aluminum alloy of Type SlMg3, which had an ultimate tensile stress $\delta_b = 180$ N/mm$^2$, a 0.2% proof stress $\delta_{0.2} = 80$ N/mm$^2$, an elongation at break $\delta_5 = 17\%$ and a Brinell hardness BHN = 45. The mesh opening size was 1 mm × 2 mm and the land width 0.5 mm. The expanded metal is coated with a matrix composed of 19% by volume zinc sulfide powder, 16% by volume glass fibers, 9% by volume Aramid (aromatic polyamide) fibers and 56% polytetrafluoroethylene (PTFE).

Figure 3:
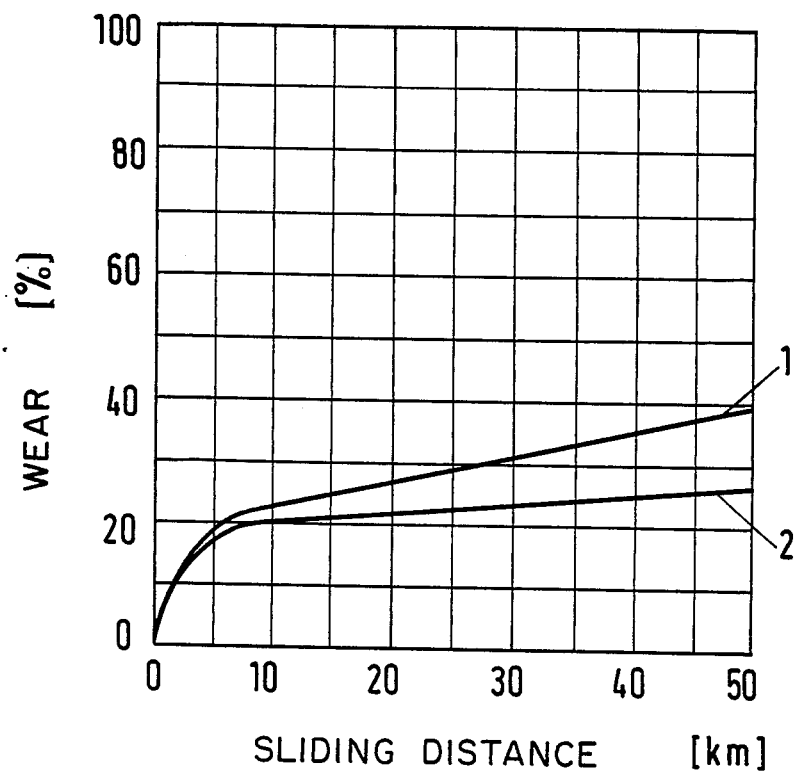
FIG. 3 is a graph of wear of the sheet material of the invention against sliding distance.

From the graph shown in FIG. 3, in which the wear is plotted against the sliding distance, it is apparent that the wear of the sheet material for sliding surface bearings in accordance with the invention (curve 1) is lower by about 25% than the wear of a conventional sheet material for sliding surface bearings (curve 2), in which the expanded metal is coated with a matrix composed of 10% lead powder, 30% glass fibers and 60% PTFE.

Figure 4:
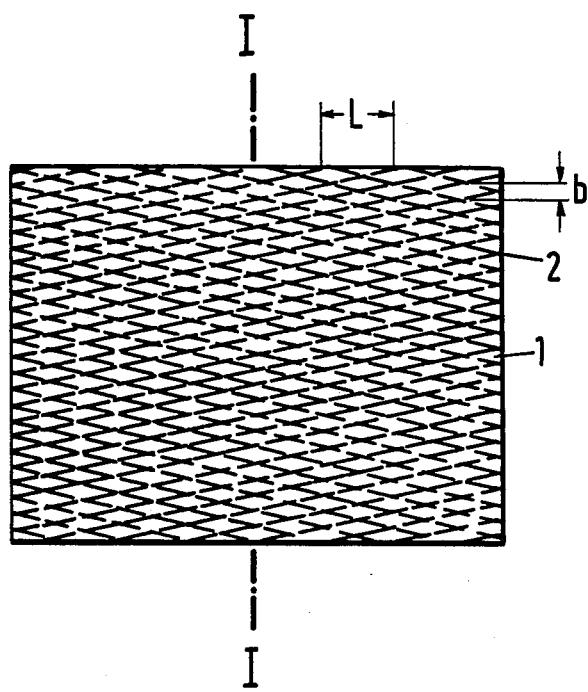
FIG. 4 is a top plan view of an expanded metal with a matrix coating.

FIG. 4 is a top plan view showing an expanded metal 2 which is coated with a matrix 1. The lands 3 are indicated by dotted lines. The mesh opening length of the expanded metal lath is designated L and its mesh opening width is designated b.

Figure 5:
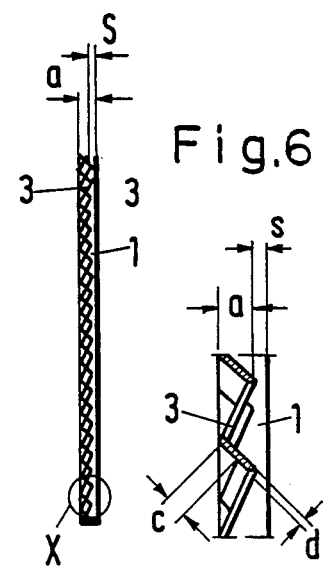
FIG. 5 is a sectional view taken along line I—I in FIG. 4.

FIG. 5 is a transverse sectional view taken on section line I—I in FIG. 4. The thickness of the friction contact layer or sliding layer 1 over the peaks of the expanded metal 2 is designated s. The thickness of the expanded metal is designated a.

Figure 6:
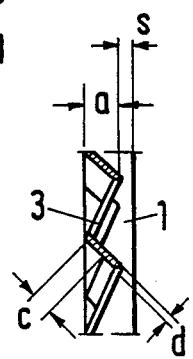
FIG. 6 is an expanded detail X of FIG. 5.

FIG. 6 shows on a larger scale the detail X indicated in FIG. 5. The land width is designated c and the land thickness if designated d.

FIG. 7 illustrates a continuous process of manufacturing the material for sliding surface bearings according to the invention. The strip of expanded metal 2 is unwound from the reel 4 and is degreased in the unit 5 and under the sprayer 6 is coated with the primer, which is dried in the heater 7. The matrix material is produced in the mixers 8 and 9 and is strewn onto the expanded metal 2 by the strewer 10 and is rolled onto the expanded metal by roll coater 11 and is then dried and subsequently sintered in the heating unit 12. The matrix is then sized by means of the rolling unit 13 and the finished strip of material for sliding surface bearings is coiled on the reel 14.

It will be appreciated that the instant specification and claims are set forth by way of illustration and not limitation and that various modifications and changes may be made without departing from the spirit and scope of the present invention.

What is claimed is:

1. A composite material for sliding surface bearings, comprising a polymeric matrix bonded to a metallic rough base surface having peaks to form a polymeric friction contact or sliding layer in a thickness from 0.01 to 2.0 mm over the peaks of the rough base surface, wherein the matrix comprises 5 to 50% by volume of barium sulfate particles, said particles having a particle size from 0.1 to 1.0 $\mu$m and an average particle size of 0.3 $\mu$m.

2. A composite material for sliding surface bearings according to claim 1, wherein the matrix further comprises a polymer selected from the group consisting of polytetrafluoroethylene, polyvinylidenefluoride, polyethersulfone, polyetheretherketone, polyetherimide, polyphenylenesulfide, polyacetal and polyimide.

3. A composite material for sliding surface bearings according to claim 1, wherein the matrix further comprises a polymer which comprises a mixture of at least two polymers in a volume ratio from 5 to 35%.

4. A composite material for sliding surface bearings according to claim 1, wherein the matrix further comprises 1.5 to 15% by volume aromatic polyamide fibers, which are 0.02 to 0.1 mm in diameter and have a length of $\leq$0.3 mm.

5. A composite material for sliding surface bearings according to claim 1, wherein the matrix further comprises at least one of glass fibers, glass spheres, carbon fibers, ceramic fibers or aromatic polyamide fibers in an amount from 5 to 40% by volume.

6. A composite material for sliding surface bearings according to claim 5, wherein the glass fibers have a length from 0.1 to 0.5 mm and a diameter from 0.02 to 0.1 mm and are contained in the matrix in an amount from 15 to 35% by volume.

7. A composite material for sliding surface bearings according to claim 5, wherein the carbon fibers, glass fibers, ceramic fibers and aromatic polyamide fibers have a length of $\leq$500 $\mu$m, and a diameter of $\leq$100 $\mu$m, and the glass spheres have a diameter from 1 to 50 $\mu$M.

8. A composite material for sliding surface bearings according to claim 5, wherein the fibers have a length of from 50 to 300 $\mu$m and a diameter of from 5 to 50 $\mu$m and the fibers and glass spheres are contained in an amount of from 10 to 25% by volume.

9. A composite material for sliding surface bearings according to claim 1, wherein the rough base surface has been formed by either a mechanical or chemical roughening of the surface of a metallic backing layer, said layer being composed of a metal selected from the group consisting of steel, bronze and a high-strength aluminum alloy.

10. A composite material for sliding surface bearings according to claim 1, wherein the rough base surface comprises a sintered or sprayed-on porous layer of bronze on a steel backing layer.

11. A composite material for sliding surface bearings according to claim 1, wherein the particles contain 1 to 5% by volume barium sulfate.

12. A composite material according to claim 11, wherein the particles further comprise 0.05 to 0.5% by volume zinc oxide.

13. A composite material for sliding surface bearings according to claim 1, wherein the matrix contains 10 to 40% by volume of the particles.

14. A composite material for sliding surface bearings according to claim 1, wherein the matrix further comprises 1.5 to 15% by volume aromatic polyamide fibers, which are 0.02 to 0.1 mm in diameter and have a length of $\leq$0.3 mm.

15. A composite material for sliding surface bearings according to claim 1, wherein the rough base comprises expanded metal.

16. A composite material for sliding surface bearings according to claim 15, wherein the expanded metal has diamond-shaped openings and has a thickness from 0.3 to 0.9 mm and comprises a wrought aluminum alloy having an elongation at break $\delta_5 = 8$ to 20% and a Brinell hardness BHN of 35 to 65.

17. A composite material for sliding surface bearings according to claim 16, wherein the matrix coating on the expanded metal further comprises 5 to 25% by volume lead, 10 to 50% by volume glass fibers and 40 to 80% by volume polytetrafluoroethylene, the matrix coating filling the openings and forming a friction contact or sliding layer comprising the matrix in a thickness of 0.01 to 0.3 mm over the peaks of the expanded metal.

18. A composite material for sliding surface bearings according to claim 17, wherein the glass fibers have a length from 0.1 to 0.5 mm and a diameter from 0.02 to 0.1 mm and are contained in the matrix in an amount from 15 to 35% by volume.

19. A composite material for sliding surface bearings according to claim 17, comprising a mixture of 56% by volume PTFE having a particle size from >3 $\mu$m to <10 $\mu$m, 16% by volume glass fibers having a diameter of 20 $\mu$m and a length of $\leq$150 $\mu$m, 9% by volume aromatic polyamide fibers having a diameter of $\leq$12 $\mu$m and a length of $\leq$300 $\mu$m, and 19% by volume zinc sulfide having a particle size of $\leq$1.0 $\mu$m.

20. A composite material for sliding surface bearings according to claim 16, wherein the expanded metal consists of a wrought aluminum alloy of the type AlMgSil or AlMg3.

21. A composite material for sliding surface bearings according to claim 16, wherein the mesh size of the expanded metal is from 0.5 mm$\times$1.0 mm to 2.0 mm$\times$3.0 mm, and the land width of the expanded metal is from 0.3 mm to 1.0 mm.

22. A composite material for sliding surface bearings according to claim 16, wherein the expanded metal is coated with a primer layer in a thickness from 2 to 10 $\mu$m.

23. A composite material for sliding surface bearings according to claim 16, wherein the mesh size is 4.0 mm$\times$2.0 mm and the land width is 0.5 mm.

24. A composite material for sliding surface bearings according to claim 1, which further comprises zinc sulfide particles.

25. A composite material for sliding surface bearings according to claim 24, wherein the matrix is composed of 60% by volume polytetrafluoroethylene having a particle size from $\leq 3$ to $<10$ μm, 20% by volume glass fibers having a diameter of $\leq 20$ μm and a length of $\leq 150$ μm, and 20% by volume zinc sulfide having a particle size of $\leq 1$ μm and containing particles containing 0.5% by volume barium sulfate.

* * * * *

UNITED STATES PATENT AND TRADEMARK OFFICE
CERTIFICATE OF CORRECTION

PATENT NO. : 4,847,135
DATED : Jul. 11, 1989
INVENTOR(S) : Braus et al.

It is certified that error appears in the above-identified patent and that said Letters Patent is hereby corrected as shown below:

Col. 4, line 21     Delete ">10" and substitute -- <10--

Signed and Sealed this

Twenty-seventh Day of November, 1990

Attest:

HARRY F. MANBECK, JR.

*Attesting Officer*     *Commissioner of Patents and Trademarks*